April 29, 1958     M. E. BOBO     2,832,162
EDUCATIONAL APPARATUS
Filed Dec. 21, 1953     2 Sheets-Sheet 1

INVENTOR.
Mildred E. Bobo
BY WHITEHEAD & VOGL
PER *Garls Whitehead*
Attorneys.

INVENTOR.
Mildred E. Bobo
BY WHITEHEAD & VOGL
PER *Earle Whitehead*
Attorneys.

United States Patent Office 2,832,162
Patented Apr. 29, 1958

2,832,162

EDUCATIONAL APPARATUS

Mildred E. Bobo, Jefferson County, Colo.

Application December 21, 1953, Serial No. 399,307

1 Claim. (Cl. 40—86)

This invention relates to changeable display devices, and more particularly to that class of devices which is adapted to changeably display or exhibit selected portions of a web or scroll of printed matter and will be hereinafter referred to as a scroll exhibitor.

The paramount features of an ordinary scroll exhibitor include a container, a pair of reels mounted within the container in spaced parallelism, a scroll of printed matter having each end wound upon one of the reels, a window in the container through which the reach of scroll between the reels may be viewed and means for rotating the reels to shift the scroll from one reel to the other so that various portions of the scroll may be viewed through the window. A primary object of the present invention is to provide an improved construction of such a scroll exhibitor to enhance and enlarge its utility, especially for educational purposes as hereinafter described.

Scroll exhibitors are used for various purposes, such as changeable signs for dance halls, auditoriums, motor busses and the like. They are also used extensively as educational devices and as such provide a selected sequence of illustrations for exhibition to a classroom group, generally to accompany a prepared dissertation or lecture. The value of scroll exhibitors is especially manifest in the teaching of elementary and primary subjects to young children, for a single illustration may be exhibited to a group of children so that all members of the group will have their attention directed to the same subject matter at the same time.

The use of such exhibitors for directing the attention of a group of children to a selected illustration is so effective in teaching that there is a need for an improved type of scroll exhibitor. Conventional types are not completely satisfactory since the window through which the scroll is viewed is fixed in area and the view cannot be restricted in situations where it is desirable to focus the attention of a class group to a single portion of an illustration showing upon the scroll, as to a single word or a letter of a word. Moreover, conventional scroll exhibitors are often built as heavy, awkward units where the reels are fixed within the container and the utility of the exhibitor is limited to the subject matter printed upon a single scroll within the container.

The present invention was conceived and developed to provide a new and improved scroll exhibitor and objects of this invention are: (a) to provide a small lightweight unit that is easily portable, yet presents a substantially large viewing window suitable for classroom or group use, (b) to provide a unit wherein the scrolls and reels may be interchanged, (c) to provide a unit having a viewing window whose opening can be varied to restrict the viewing of the scroll to any selected portion thereof and (d) to provide a simple, compact unit which is economical in cost, yet of a rugged durable construction.

With the foregoing and other objects in view, all of which more fully hereinafter appear, my invention comprises certain novel constructions, combinations and arrangements of parts and elements as hereinafter described, and as defined in the appended claim, and illustrated, in preferred embodiment, in the accompanying drawing, in which:

Figure 1:
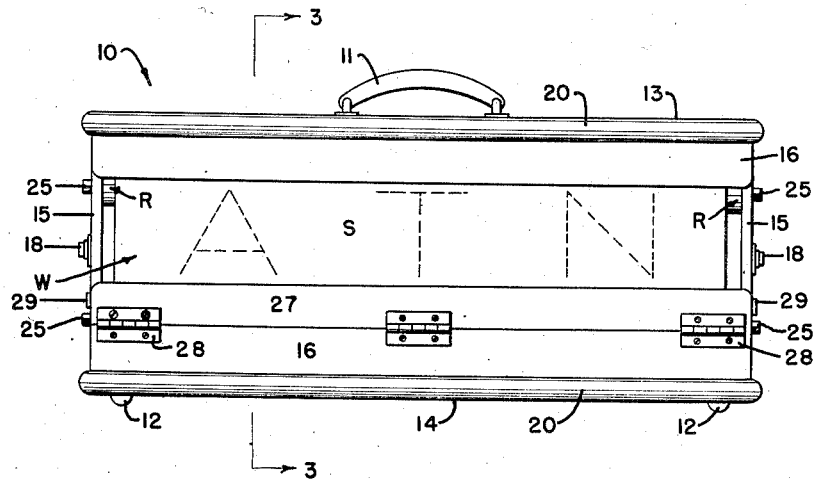
Figure 1 is a front side elevation view of a preferred construction of my improved scroll exhibitor, illustrating the window through which the scroll is viewed as being restricted in height, as hereinafter described in detail.

Referring more particularly to the drawing, my improved scroll exhibitor is illustrated as a longitudinally-symmetrical double-scroll unit with a viewing window W at each side of the case 10 forming the unit, most of the elements of construction of the two sides being substantially the same. The case 10 is formed as an elongated, rectangular box made of flat members such as boards and is proportioned to enclose the two scrolls S and the reels R upon which they are mounted. This case is of such weight and size that it becomes a self-contained portable unit with a suitable carrying handle 11 at the top and may include rubber support knobs 12 at the corners underneath the bottom.

This case 10 is formed of three interlocking sections, and includes a central body-section 10a and side-closing sections 10b which may be disconnected from the central body section as clearly illustrated at Fig. 5, for the removing and exchanging of reels and scrolls as hereinafter described. The central body section 10a is formed of the case top member 13, bottom member 14 and upright narrower members which interconnect each end of the top and bottom members and form the central end wall portion 15a of each end wall 15. Each side-closing section 10b is formed of side-wall members 16 above and below the side window W and a narrow interconnecting end-wall-side portion 15b, outstanding from each end of the members 16. These end-wall-side portions 15b are adapted to abut against the central end-wall portions 15a to complete the end walls 15 when the side-closing sections 10b are interlocked into position with the central body portion 10a.

Each side-closing section 10b is held in position between the top 13 and bottom 14 of the central-body-section 10a in stepped lips 17 along the edges of the undersurface of the top 13 and the top surface of the bottom 14. These lips 17 are of the same width as the edge thickness of the side-wall members 16 and end-wall-side-portions 15b so that the edges of the members are matched with the offsets formed by the lips 17. When a side-closing-section 10b is so positioned and fitted in the offsets formed by the lips, it may be locked to the central section 10a by a pull-latch 18 at each end of the case having its base 18a upon the central-end-wall-portion 15a and its head 18b upon the end-wall-side-portion 15b.

The box-like case is trimmed with half-round edging strips along the top and bottom edges thereof and these strips include end strips 19 at the top and bottom of the end walls 15 and side strips 20 at the top and bottom of the side-wall members 16. The end strips 19 are attached to the central-end-wall-portion 15a and combine with the stepped lips 17 to form grooves into which the end-wallside-portions 15b slidably fit. The side strips 20 extend above and below the side-wall members and provide a step-like construction supplementing the steps 17 as clearly shown at Fig. 3.

Each reel R is formed as a cylindrical body 21 having a smaller diameter shaft 22 extending from each end thereof. The length of the body of each reel is slightly less than the length of the case 10 so that it may be mounted longitudinally within the case with each shaft 22 extending through a suitable bearing orifice 23 in an end wall 15.

Each scroll S is mounted upon a pair of reels R, and each pair is positioned at one side of the case with one reel at the top and the other reel at the bottom thereof so that the reach of the scroll S between the reels will extend across the window W in the side-closing-section 10b. The bearing orifices 23 in the end walls 15 which hold the shafts 22 are thereby positioned, one above the other at each side of each end wall 15 and are centered upon the abutting edges 24 of the central-end-wall-portion 15a and side portions 15b so that one half 23a of each bearing orifice is in the central-end-wall-portion 15a and the other half 23b is in the side-end-wall-portion 15b. It follows that a pair of reels may be mounted within the case by removing a side-closing-section, positioning the reels in the orifice halves 23a and then replacing and locking in position the side-closing-section.

Figure 4:
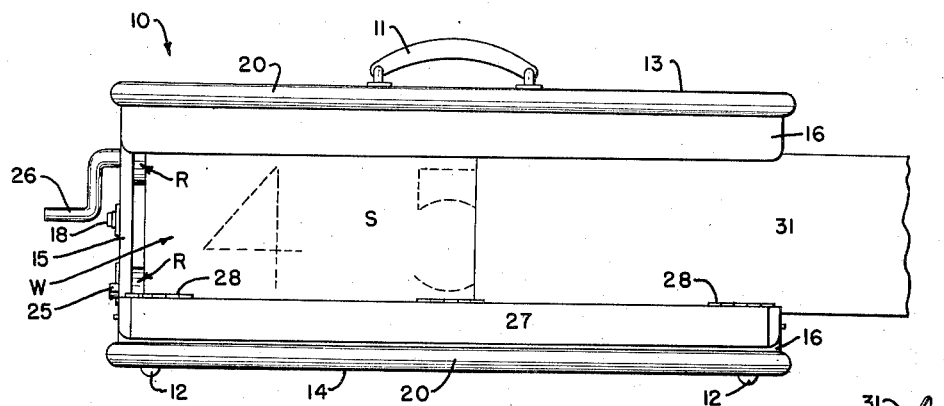
Figure 4 is a front side elevation view, similar to Fig. 1, with the window opened to its full height but with the window opening restricted in width as hereinafter described and also showing a reel-rotating crank in position.

Each shaft 22 is sufficiently long to extend a short distance beyond the end wall 15 when the reel is mounted in place and this extension is formed as a square or spline-shaped knob 25 adapted to receive a crank 26 for rotating the reels as clearly shown at Fig. 4, such being a conventional manner of operation of such a unit.

Figure 2:
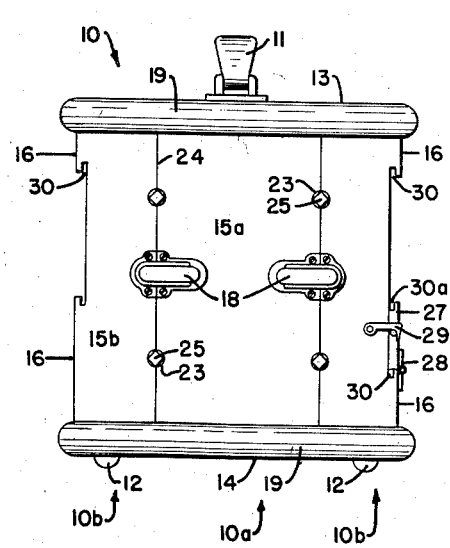
Figure 2 is an end view of the unit shown at Fig. 1.
Figure 3:
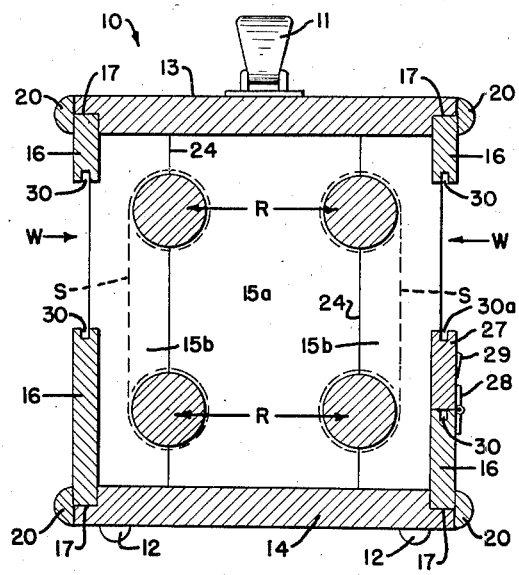
Figure 3 is a section as taken on the indicated line 3—3 at Fig. 1 but on a slightly enlarged scale, the scrolls therein being indicated in broken lines.

In the illustration the window W on one side of the case is fixed in height while the other window W is illustrated as being variable in height. Such variation is obtained by a longitudinal strip 27 hinged as at 28 to the base edge of the window. This strip may be turned upwardly to reduce the window height as illustrated at Figs. 1, 2 and 3 or turned downwardly to provide a window opening of maximum height as illustrated at Figs. 4 and 5. A hook 29 may be positioned at each case end 15 to fasten the strip in its upward position, as clearly shown at Fig. 2.

Figure 5:
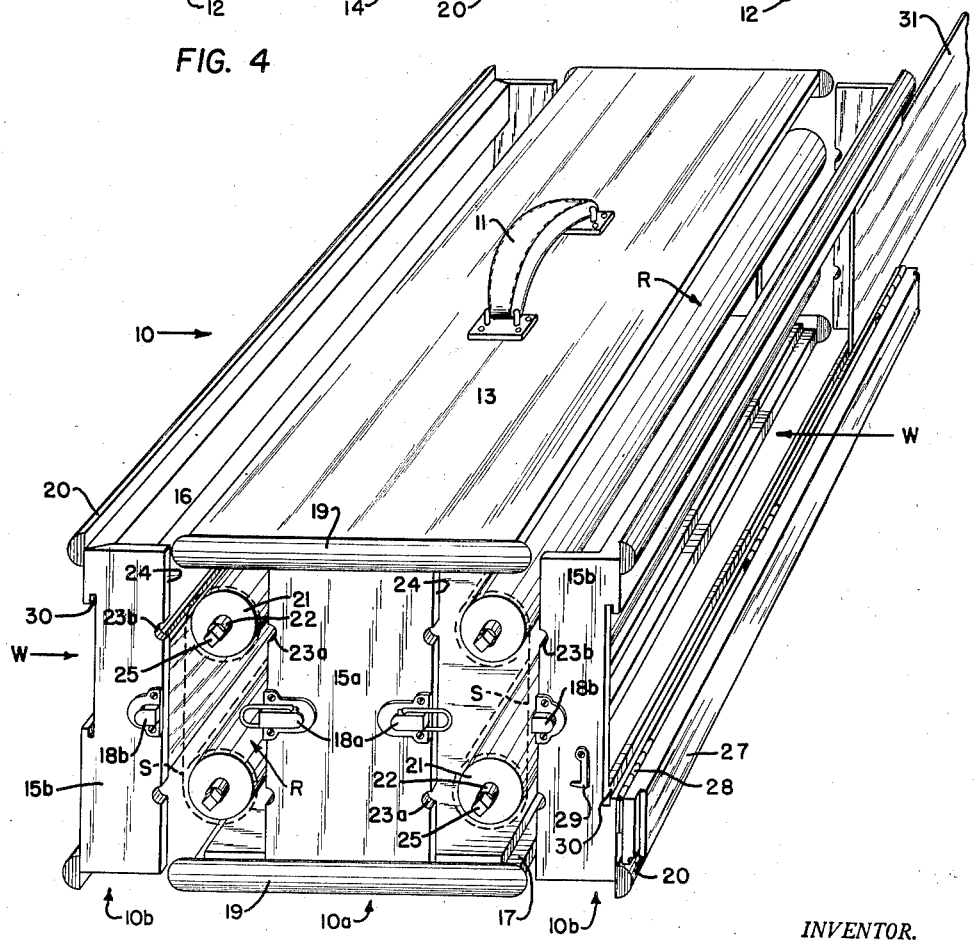
Figure 5 is an exploded perspective view of the unit to better illustrate details of construction not otherwise shown and to illustrate the manner of dismantling the container for the replacing of, or exchanging, reels, the positioning of the scrolls upon the reels being shown in broken lines.

The top and bottom edge of each window is provided with a longitudinal slot 30 so that a cover slide 31 may be positioned within the slots to move across the opening and over the window and restrict its width as clearly shown at Figs. 4 and 5. It is to be noted that the strip 27 is provided with a slot 30a in the same manner as slots 30 to receive a narrower cover slide, similar to slide 31, so that the window opening of the exhibitor may be restricted as to its height and width at the same time. When the strip 27 is used, it is suitably locked in position by a latch 31.

The use of this exhibitor is simple, for a pair of reels carrying a scroll may be mounted upon each side of the case and the component parts forming the case then locked into position as hereinbefore described. The scroll is then shifted from one reel to another by simply rotating the reels as with the crank 26. At the same time the viewing window W may be restricted in area, both as to height and width in any manner desired.

While I have illustrated and described many details and arrangements of construction, other modifications and alterations of construction which are within the scope and spirit of my invention will occur to those skilled in the art, and hence, it is my desire that my protection be limited not by the constructions illustrated and described, but only by the proper scope of the appended claim.

I claim:

A scroll exhibitor, comprising, in combination, a container having a window therein, a pair of reels mounted within the container in spaced parallelism with a reel at each side of the window, a scroll having each end wound upon a reel with the span between the reels extending across the window and shutter means adapted to selectively vary the size of the window opening, said means including open-end guides along the opposing side edges of the window aperture adapted to receive an opaque slide board having a width substantially that of the window opening, a hinged strip alongside one side edge adapted to fold out of the window opening to expose the side edge guide with the window open to full width and to fold into the window opening to narrow the width thereof, a guide on the end of the strip adapted to move into alignment with the guide at the opposing side of the window with the strip folded into the window opening and adapted to receive an opaque slide board having a width narrower than that of the window opening.

References Cited in the file of this patent

UNITED STATES PATENTS

| | | |
|---|---|---|
| 786,610 | Terry | Apr. 4, 1905 |
| 1,514,588 | Ruettimann | Nov. 4, 1924 |
| 1,833,595 | Samson | Nov. 24, 1931 |
| 1,971,263 | Hullinger | Aug. 21, 1934 |
| 2,657,487 | Sprung | Nov. 3, 1953 |

FOREIGN PATENTS

| | | |
|---|---|---|
| 128,381 | Great Britain | June 17, 1919 |
| 382,986 | Great Britain | June 6, 1932 |
| 455,780 | Great Britain | Oct. 27, 1936 |